Sept. 28, 1954  J. W. RICH  2,690,080
MEASURING CUP
Filed Aug. 10, 1951

INVENTOR
JOHN W. RICH
BY
ATTORNEYS

Patented Sept. 28, 1954

2,690,080

UNITED STATES PATENT OFFICE 2,690,080

MEASURING CUP

John W. Rich, Los Angeles, Calif.

Application August 10, 1951, Serial No. 241,215

2 Claims. (Cl. 73—429)

The present invention relates to adjustable measuring cups and in particular to a device of the kind which may be used both for liquid and for semi-solid materials and which may be adjusted without the necessity of reading graduations inscribed on some part thereof.

Previously known adjustable measuring cups have been designed for use in measuring semi-solid materials such as shortening, and have been incapable of use in measuring liquids because of the incorporation of slots and the like forming a part of the adjusting arrangement, through which slots liquid materials placed in the cup would pass quite readily. They have therefore not covered a general use because in ordinary kitchen operations it is extremely inconvenient to have to remember that a particular measuring cup can be used only for semi-solid and not for liquid material.

Such previously known measuring cups have also in general been constructed so as to require the user to visually read inscribed graduations on some part of the cup in adjusting it to one or another capacity. This also militates against the general use of such devices because such graduations are easily obscured by flour or other materials frequently scattered in kitchen operations, thus making it very difficult for the user to be sure that the device is correctly adjusted for the needs of the moment.

The present invention contemplates the provision of an adjustable measuring cup in which the deficiencies of such prior art devices are eliminated in general by the employment of a cup comprising an open ended shell having a plunger slidably fitted within it and provided with means at the edge of the plunger constituting a seal against the leakage of liquid between the plunger and the shell. In order to make possible "blind" adjustment of the position of the plunger within the shell, the present invention contemplates the provision of a plurality of stops each disposed in an aperture in the shell and having a portion movable into and out of the path of sliding movement of the plunger. These stops are located in the illustrated embodiment at the one-quarter, one-half, and three-quarter cup positions of the plunger, and while graduations may conveniently be inscribed adjacent the stops on the exterior of the shell, for the initial instruction of the user, it will be clear that reference to these graduations will be completely unnecessary after the user has once learned the significance of the various plunger positions. In order to complete the accommodation of the device for liquid as well as for semi-solid material measurement, each of the stops is preferably provided with means constituting a seal against the leakage of liquid through the aperture associated with the stop.

The novel features characteristic of the invention are defined with particularity in the appended claims. The invention itself, however, together with additional objects and advantages thereof, will be best understood from the following description of a specific embodiment, reference being had to the accompanying drawings, in which:

Figure 1:
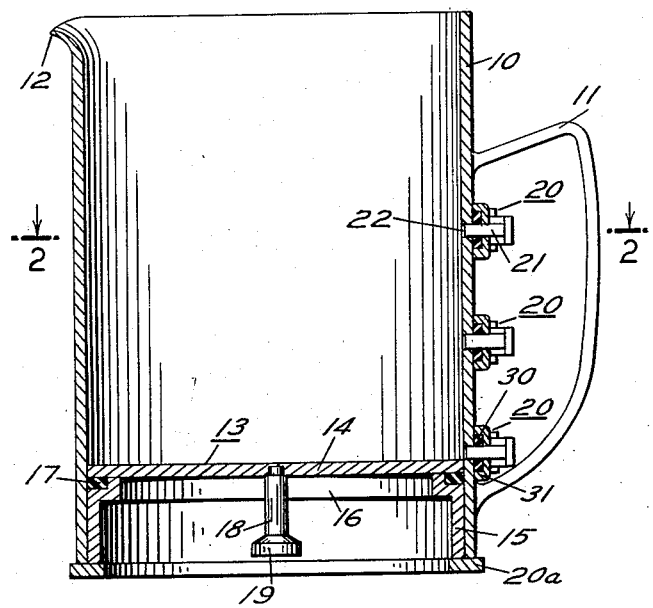
Figure 1 is a view in vertical cross-section of a measuring cup embodying the present invention.

Referring to the accompanying drawing, it will be seen that the measuring cup of the present invention comprises an open-ended shell 10 which may, but need not be, of transparent material and which is preferably provided with a convenient handle 11 and a pouring lip 12. Slidably fitted within the shell 10 is a plunger 13 which comprises a disc portion 14 and a second annular portion 15 secured to the disc portion 14 and provided with an annular offset 16 defining a circumferential groove in the plunger in which a sealing ring 17 of neoprene or the like is received and engages the inner wall of the shell 10 as shown. Secured to the plunger 13 is a handle member 18 preferably having an enlarged head 19 by which it may be grasped to move the plunger in either direction within the shell.

Figure 3:
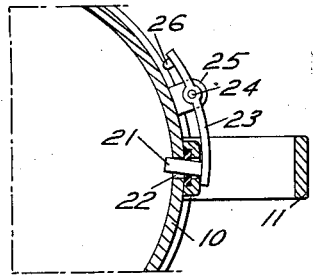
Figure 3 is a fragmentary horizontal cross-sectional view similar to Figure 2 except in that the adjustable stop is shown in its active instead of in its passive position.
Figure 4:
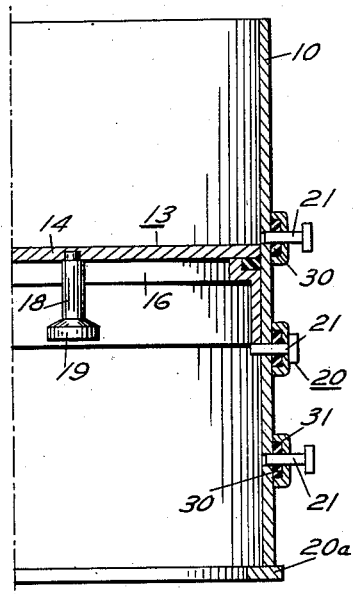
Figure 4 is a fragmentary vertical cross-sectional view showing the slidable plunger of Figure 1 in the one-half cup position arrested by the stop at that position.
Figure 2:
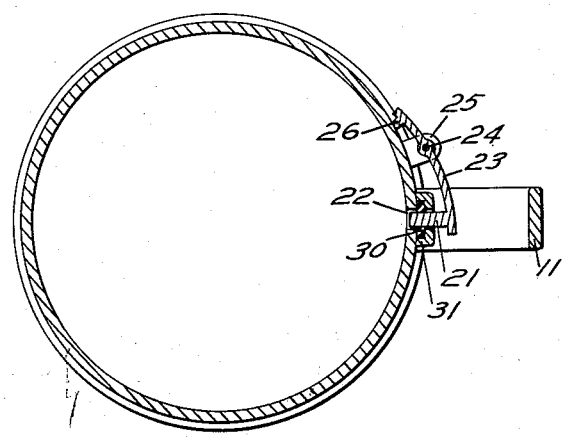
Figure 2 is a horizontal sectional view of such device, the section being taken on the line 2—2 of Figure 1.

The capacity of the measuring cup of the present invention may be adjusted by sliding the plunger 13 within the shell 10 to any desired position. For the purpose of releasably retaining the plunger 13 in any of a plurality of selected positions within the shell 10 there is provided a series of stops 20, each comprising a pin 21 disposed in an aperture 22 in the shell 10 and slidable in said aperture between the position in which said pins are shown in Figures 1 and 2 and the position in which the pin is shown in Figure 3; the middle one of the pins 21 being shown in this position in Figure 4. When all of the pins are in the position shown in Figures 1 and 2, they are out of the path of movement of the plunger 13, but when they are in the position shown in Figure 3, they lie in the path of movement of the plunger 13 and will arrest its movement in the manner indicated in Figure 4. When the plunger is in the "full cup" position in which it is shown in Figure 1, it bottoms against a flange 20a, secured to the lower edge of shell 10.

For the purpose of facilitating movement of the pins 21 from one of these positions to the other, each pin is preferably mounted on an arm 23 pivotally mounted at 24 on legs 25 secured to the shell 10. Opposite the pivot 24 each of the arms 23 is preferably provided with a stop 26 to limit outward movement of the pin 21.

For the purpose of constituting a seal against the leakage of liquid through the apertures 22 and thence away from the exterior of the shell 10, each of the stops is preferably provided with means constituting a seal against such leakage. In the illustrated embodiment this seal consists of a flexible washer 30 of neoprene or the like closely embracing its respective pin 21 and retained in position thereon by a recessed disc 31 secured to the shell 10 as by cementing.

In use it is intended that the plunger 13 will initially be moved to a position in the shell 10 higher than that of the stop 20 which it is intended will be set to measure the quantity of shortening or liquid desired. When the plunger 13 has been slid to said position, the appropriate stop will be pressed in to the position shown in Figure 3 by the finger of the operator, and the plunger 13 will then be moved downwardly until its contacts the said stop in the manner in which the plunger 13 is shown as contacting the middle one of the three stops in Figure 4. The space within the shell above the plunger 13 is then to be filled with a semi-solid material such as shortening after which it is intended that the plunger 13 will be pushed to a position at which its upper surface is flush with or slightly above the upper edge of the shell 10, after which it is necessary only to scrape the material off the surface of the plunger 13.

When the device is used for measuring liquids, it is, of course, unnecessary to move the plunger upwardly after filling as above described, since the liquid can be readily poured from the cup.

As will be evident from the foregoing, the described embodiment of the present invention achieves the objects of providing a cup which is equally useful for measuring both liquid and semi-solid materials and of providing an adjustable cup which may be adjusted by the operator solely by touch and without reference to inscribed indicia, although such indicia may, of course, be provided for the initial instruction of the operator as to the significance of the several stops provided.

What is claimed is:

1. An adjustable measuring cup for liquid and semi-solid materials comprising a shell having open ends, a plunger slidably fitted within said shell and provided with means at the edge thereof constituting a seal against the leakage of liquid between said plunger and said shell, a plurality of apertures in said shell disposed longitudinally thereof, a plurality of stops, each disposed in one of said apertures in said shell, and having a portion movable into and out of the path of sliding of said plunger; each of said stops being provided with means constituting a seal against the leakage of liquid through the associated aperture, and a pivotally mounted lever connected with each of said stops to hold the same in its aperture and movable to position said stop into and out of the path of said plunger whereby different predetermined volumes are measurable by the cup defined by said shell and plunger when the plunger is supported above the different stops.

2. An adjustable measuring cup for liquid and semi-solid materials comprising a shell having open ends, a plunger slidably fitting within said shell; said plunger comprising a disc portion and a second portion defining a circumferential groove between them, a sealing ring seated in said groove and engaging the inner wall of said shell, a plurality of apertures in said shell disposed longitudinally thereof, a plurality of stops, each disposed in one of said apertures in said shell, and having a portion movable into and out of the path of sliding movement of said plunger; each of said stops being provided with means constituting a seal against the leakage of liquid through the associated aperture, and a pivotally mounted lever connected with each of said stops to hold the same in its aperture and movable to position the associated stop into and out of the path of said plunger; whereby different predetermined volumes are measurable by the cup defined by said shell and plunger when the plunger is supported above the different stops.

References Cited in the file of this patent

UNITED STATES PATENTS

| Number | Name | Date |
|---|---|---|
| 153,352 | Lietzell | July 21, 1874 |
| 168,679 | Sullivan, Jr. | Oct. 11, 1875 |
| 628,622 | Fulton | July 11, 1899 |
| 1,891,032 | Venable | Dec. 13, 1932 |

FOREIGN PATENTS

| Number | Country | Date |
|---|---|---|
| 223,565 | Switzerland | Dec. 1, 1942 |